Jan. 20, 1970 R. B. STONE 3,491,305

FM DEMODULATOR ZERO-CROSSING DETECTOR

Filed Dec. 21, 1966 2 Sheets-Sheet 1

INVENTOR.
ROGER B. STONE

BY

ATTORNEY

Jan. 20, 1970 R. B. STONE 3,491,305

FM DEMODULATOR ZERO-CROSSING DETECTOR

Filed Dec. 21, 1966 2 Sheets-Sheet 2

INVENTOR.
ROGER B. STONE

BY Anthony D. Cennamo

ATTORNEY

United States Patent Office 3,491,305

Patented Jan. 20, 1970

3,491,305

FM DEMODULATOR ZERO-CROSSING DETECTOR

Roger B. Stone, Webster, N.Y., assignor to Xerox Corporation, Rochester, N.Y., a corporation of New York Filed Dec. 21, 1966, Ser. No. 603,640

Int. Cl. H03d 3/04

U.S. Cl. 329—126 8 Claims

ABSTRACT OF THE DISCLOSURE

A zero-crossing detector for use in demodulating frequency modulated signals. A unit pulse is generated every time the incoming frequency modulated signal passes through the zero axis to be used by a filter and decoding apparatus to detect the modulating information.

Background

In the frequency modulating technique known as frequency shift keying, data transmission is accomplished by assigning a different carrier frequency to each state of the data, i.e., mark and space, and transmitting the appropriate frequency for a period of time sufficient to assure reliable detection. The technique may be extended to include frequency transmission of data information with more than the normal two-level mark and space frequencies. That is, in a multilevel data transmission system employing frequency shift keying, a plurality of frequencies would be transmitted, one frequency for each level in the data waveform.

Transmission of the frequency modulated or frequency shift keyed signal in a facsimile or other type of system, for example, may be accomplished over any of the known transmission media, such as telephone lines, microwave installations and direct wire. At a receiving location the frequency modulated signals must be demodulated and detected in order to obtain the original transmitted information. If the transmitted information is in the form of frequency shift modulated waves, one prior art technique of demodulation is to employ frequency selective filters, which are tuned to the specific frequencies that were transmitted. With such a system, therefore, highly selective filters are necessarily expensive and have the inherent defect of a relatively long filter rise time.

Another well-known prior art technique is to detect the zero-crossings of the long-term average value of the incoming frequency modulated signals. Upon detection of the zero-crossings signals can be generated in response thereto and passed through a low pass filter which effectively takes the short term average of the pulses. This average signal can then be decoded to recover the information in the signal waveform. Inasmuch as the entire demodulation process is dependent upon accurate detection of the zero-crossings, a reliable zero-crossing detector must be provided without attendant time jitter or distortion of the frequency modulated signal.

Objects

It is, accordingly, an object of the present invention to provide an improved frequency modulated signal demodulator.

It is another object of the present invention to increase the efficiency of a data transmission system utilizing frequency shift keying.

It is another object of the present invention to improve the demodulation of frequency shift keyed signals.

It is another object of the present invention to effectively determine the zero-crossing points of the long-term average value of a frequency modulated signal.

Brief summary of the invention

In accomplishing the above and other desired aspects, applicant has invented new and improved apparatus for accurately determining the points at which frequency modulated signals in a demodulator cross the axis defined as the long-term average value of the signal, which is used to generate signals in accordance with such zero-crossings to determine the frequencies transmitted for later decoding and retrieval of such information. The invention utilizes a circuit for generating signals upon detection of positive-going zero-crossings. A similar circuit is provided for generating an output signal upon detection of negative-going zero-crossings. These signals are then used to trigger a monostable multivibrator to give constant width pulses upon detection of such positive pulses. These pulses can then be passed to a low-pass filter to obtain the familiar eye pattern which can be used to decode the signal for recovery of the original information.

Description of the drawings

For a more complete understanding of the invention, as well as other objects and further features thereof, reference may be had to the following detailed description in conjunction with the drawings wherein.

Detailed description of the invention

Figure 1:
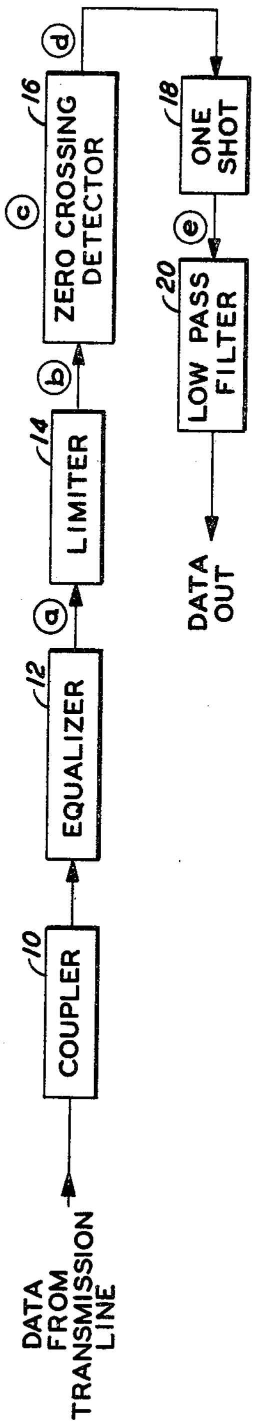
FIGURE 1 is a block diagram of the demodulator in accordance with the principles of the present invention.

Referring now to FIGURE 1, there is shown a block diagram of the demodulator circuit for the frequency modulated signals as received from a transmission media, of any known type. At the output end of the transmission media would be some sort of coupling apparatus 10 to couple the transmission line to the demodulating apparatus. Such a coupler could be a direct electronic coupler, or may be of the acoustic coupling type whereby the transmitted information is acoustically detected, as via a telephone receiver on the end of a telephone network, for example.

From the coupler 10 the signals would then pass to an equalizer circuit 12 to provide equalization for the specific characteristics of the transmission medium. Such an equalizer circuit may be of any of the known types, such as for frequency attenuation and/or phase distortion. The output from the equalizer 12 would then be a signal seen in FIGURE 2*a* which, for purposes of example, comprises a frequency shift-keyed signal of four frequencies, $f_1$, $f_2$, $f_3$, and $f_4$.

The signals from the equalizer 12 are then passed to the limiter 14 of any known design, to amplify and soft limit the input signals to generate essentially squarewave pattern where the rise time is a function of the amplitude of said input signals fed thereto to produce a waveform seen in FIGURE 2*b*.

The zero-crossing detector 16, in a manner more fully hereinafter described, generates pulses, FIGURE 2*c*, in accordance with the zero-crossings determined from FIGURES 2*a* and 2*b*. As it is desired to produce all positive pulses of standard height and width in accordance with the principles of the present invention, the zero-crossing detector 16 further generates the positive pulse train seen in FIGURE 2*d*. One shot multivibrator 18 receives the waveform in FIGURE 2*d* and generates the output pulse train seen in FIGURE 2*e*.

Low pass filter 20 receives the pulse waveform from one shot multivibrator 18 and produces the familiar eye pattern in the form of demodulated information in accordance with the input pulse train in FIGURE 2*e* which can be subsequently decoded to recover the transmitted information.

FIGURE 2*e* shows the generated pulses to be in the form of constant width pulses generated in response to the zero-crossings of the long-term average value of the input pulse train seen in FIGURE 2*a*. The fact that these pulses occur upon detection of the zero-crossings of the input information would allow the low pass filter to determine the average value of such pulses which, as previously mentioned, can be utilized to recover the transmitted information in a subsequent decoder. The pulses, however, may be varied in width in addition to being displaced in accordance with the zero-crossings in order to further enhance the demodulation and detection of the transmitted information. This is shown by the discussion which follows.

If the rise and fall times of the generated pulses are assumed to be negligible, then for a given signalling frequency, $f_n$, then the average value, $V_n$, will be $$V_n=V_o+2f_nT_p(V_p-V_o) \qquad (1)$$

where $T_p$ is the unit pulse in seconds of width, $V_o$ is the voltage when the pulse is absent, and $V_p$ is the voltage during the pulse. Normally, $T_p$, $V_p$ and $V_o$ are held constant and $f_n$ is the only variable. It is seen, therefore, that $V_n$ is a linear function of $f_n$. A possible variation of this can be made by making $T_p$ proportional to the period of the incoming signal $f_n$, i.e., $$T_p=\frac{k}{2f_n}+c \qquad (2)$$

the formula then reduces to $$V_n=V_o+2\left(\frac{k}{2f_n}+c\right)f_n(V_p-V_o)=V_o+(k+2cf_n)(V_p-V_o)=V_o(1-k)+2cf_n(V_p-V_o)+kV_p \qquad (3)$$

which is again a linear function of frequency.

As an example of the fixed pulse width system, the signalling frequencies could be $f_1=1350$, $f_2=1650$, $f_3=1950$, $f_4=2250$. The choice of $T_p$, $V_p$ and $V_o$ is left for the circuit designer. From Equation 1:

$$\frac{\Delta V_n}{\Delta f_n}=2T_p(V_p-V_o) \qquad (4)$$

Therefore, the gain of the demodulator is seen to increase with increasing pulse area. It is desired to make the pulse as high and as wide as possible within practical limitations. The most obvious practical limitation is that the pulse width must not exceed one-half the period of the highest signalling frequency, since this would cause overlapping of the pulses which would invalidate Equation 1. Stating this in another way it can be said that $V_n$ cannot exceed $V_p$ implying that $T_p$ cannot exceed one-half $f_n$. In the example, then $$T_p=\frac{1}{2\times 2250}=222 \text{ microseconds}$$

is a necessary condition.

If the method of determining the zero-crossing points was not precise or that some distortion was introduced during transmission of the signal, the distance from the start of a pulse produced by a positive-going zero-crossing to the start of a pulse produced by a negative-going zero-crossing might not be quite equal to the distance from the negative to the positive zero-crossing. The shorter of these two times must therefore be used to set an upper limit on pulse width to prevent overlapping.

The other parameter affecting gain is $(V_p-V_o)$. The practical limit on this is the voltages available, breakdown voltage of the circuitry driving the low-pass filter, and the breakdown voltages of the components of the low-pass filter. It should be noted that the definition of "zero" used herein requires of the circuits only that the average value be maintained. Therefore, non-linearity may be introduced as long as the resulting waveform is still symmetrical about the original "zero" axis.

Figures 3, 4:
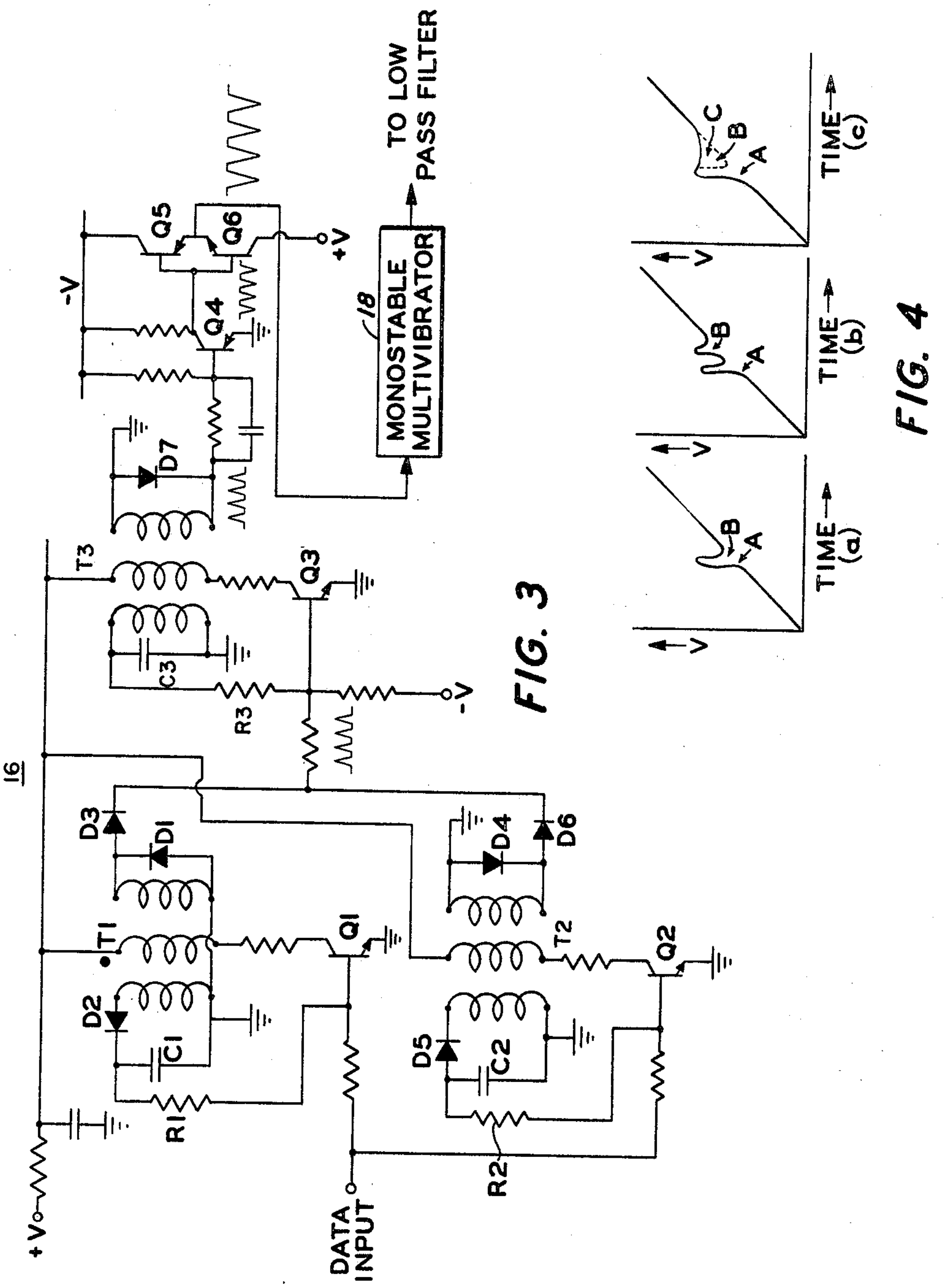
FIGURE 3 is a schematic diagram of the zero-crossing detector circuit of FIGURE 1.
FIGURE 4 shows various waveforms helpful in understanding the schematic diagram in FIGURE 3.

The zero-crossing detector 16 in FIGURE 1 is shown in more detail in FIGURE 3. The circuitry associated with transistor Q1 causes a pulse to be emitted when the positive-going zero-crossing occurs and the circuit of transistor Q2 emits a pulse for negative-going zero-crossings. As the incoming waveform goes positive, as for a positive-going zero-crossing, the base-emitter junction of transistor Q1 becomes slightly forward biased and a small amount of current begins to flow in the collector circuit in addition to the transistor leakage current that flows there. This change in current causes a voltage to be developed across the transformer T1 windings which is positive at the indicated dotted end with respect to the undotted end. This positive voltage is coupled back to the base of the transistor Q1 through diode D2 and resistor R1 which causes the transistor to turn on further and this process regenerates until the transistor saturates. This action will be described in more full detail in conjunction with FIGURE 4.

The voltage across the coils of transformer T1 remains for a time determined largely by the inductance of the transformer coils. Similar regenerative action would occur as the input signal began to turn the transistor off except that a diode, D1, across the output coil of the transformer T1 prevents it. The diode D2 and the capacitor C1 keeps transistor Q1 turned on even after the generated pulse is over to allow the input signal to reach a value which will saturate the transistor Q1. Without this diode, it would be possible for an input wave with a poor rise time to cause double pulsing.

As limiting circuits are usually less than ideal limiters, the output signals therefrom have a rise and fall time which is a function of the signal amplitude and the signalling frequency. It is thus important that the zero-crossing detector utilized be insensitive to slope. In FIGURE 4 are shown three waveforms from the base of transistor Q1 which is the sum of the input wave and the generated pulse. This is shown in FIGURE 4A where A shows the point at which the transistor begins to turn on and B shows the point at which the transistor saturates. If however, the slope of the input wave was so gradual that at the end of the generated pulse the input waveform had not increased sufficiently to hold the transistor completely turned on, as shown in FIGURE 4B, then a second pulse would be generated which would cause a width error in the one shot multivibrator 18 which follows the zero-crossing detector in FIGURE 3.

Thus it can be seen that the addition of diode D2 in conjunction with transistor Q1 does not change the width of the output pulse but does hold the transistor Q1 in its "on" state for a longer time period which greatly improves the performance at low signal levels. Thus, at FIGURE 4C is shown the curve with one peak, thereby providing to one shot 18 a single pulse with which to generate the constant or variable width pulse as hereinbefore described.

The operation of the negative-going zero-crossing circuit in conjunction with transformer T2, transistor Q2, resistor R2 and capacitor C2, is similar to the operation of transistor Q1 except that diodes D4 and D5 are reversed to allow regeneration to occur on negative-going signals. The pulses from either of the outputs of circuits with transistors Q1 and Q2 are combined by diodes D3 and D6 in an OR gate function and passed on to a circuit with transistor Q3 which with transformer T3, capacitor C3 and resistor R3 operates similarly to the circuit of transistor Q1 and which, therefore, emits a pulse of standard width for zero-crossings of either type. This pulse is then standardized in height and inverted by the circuit of transistor Q4. Transistors Q5 and Q6 provide power gain to drive the monostable multivibrator 18. This multivibrator adjustably determines the width of pulse $T_p$.

Figure 2:
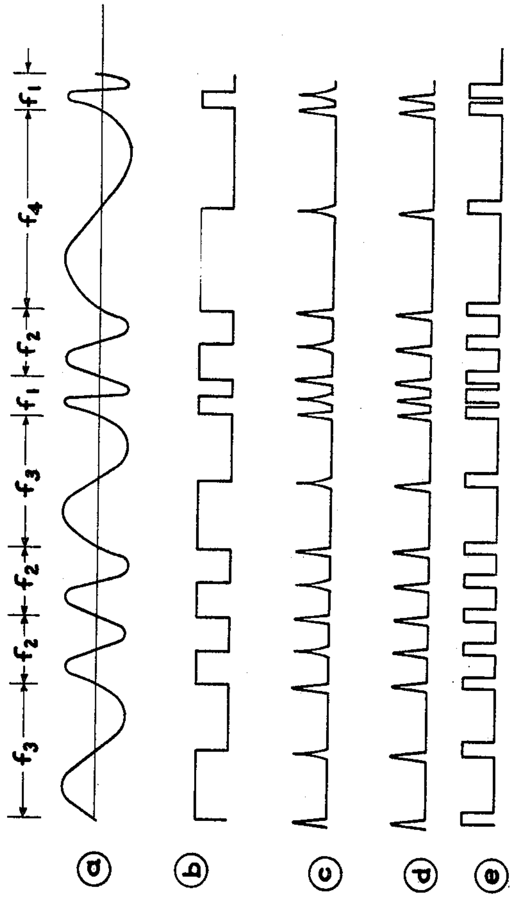
FIGURE 2 shows various waveforms helpful in understanding the block diagram of FIGURE 1.

The generated pulses from one shot 18 would then be passed to low pass filter 20, as was described in conjunction with FIGURES 1 and 2. The output from filter 20 is the demodulated frequency modulated signals, in this instance a four-level signal, which can be decoded in any known manner to recover the transmitted information.

In the foregoing, there has been disclosed apparatus for effectively determining the zero-crossings of the long-term average value of a transmitted frequency modulated signal. The circuitry was described in conjunction with a four-level signal; but it is obvious, however, that such four data levels are exemplary only, as any number of levels could be demodulated in a similar manner in accordance with the principles of the present invention. In addition, the circuitry was described in conjunction with standard width pulses but one skilled in the art may, as hereinbefore described, utilize the present invention to generate pulses of variable width in order to enhance the demodulation process. The circuit has utility in any frequency modulated data transmission system. Facsimile transmission systems, for example, utilizing the frequency modulation technique would advantageously use the disclosed invention in the demodulation of the transmitted information. Thus, while the present invention, as to its objects and advantages, as described herein, has been set forth in specific embodiments thereof, they are to be understood as illustrative only and not limiting.

What is claimed is:

1. A demodulating circuit for frequency modulated signals comprising:

means for amplitude limiting said frequency modulated signals to obtain signals with a finite rise time in essentially a square wave format, first means for generating short duration signals upon detection of positive-going signal crossings of the axis representing the long term average value of the square wave signals, second means for generating short duration signals upon detection of negative-going signal crossings of the axis representing the long-term average value of the square wave signals, third means coupled to said first and second generating means for generating short duration pulses in response to the pulses representing the positive and negative-going axis crossings, fourth means for generating pulses of finite time duration in response to the pulses eminating from said third means, and means for taking the short-term average value of the finite time width pulses to obtain an analog voltage signal in accordance with the information contained in the frequency modulated signals.

2. The circuit as defined in claim 1 wherein said fourth means comprises multivibrator means for generating finite time signals of equal duration.

3. The circuit as defined in claim 1 wherein said fourth means comprises multivibrator means for generating finite time signals of unequal time duration as a linear function of the period of the signalling frequency.

4. In a frequency modulated signal demodulator circuit, a zero-crossing detector for generating short duration pulses at the axis crossings of the long term average value of the frequency modulated signals comprising first circuit means for generating short duration signals in response to the positive-going zero-crossings of the frequency modulated signals, second circuit means for generating short duration signals in response to the negative-going zero-crossings of the frequency modulated signals, and third circuit means coupled to said first and second circuit means for generating uniform short duration pulses in response to the short duration pulses from said first and second circuit means.

5. The circuit as defined in claim 4 wherein said first circuit means comprises a first transistor with emitter, base, and collector electrodes, a first transformer with a primary winding and first and second secondary windings, said primary winding coupled in series between a power supply source and the collector electrode of said transistor, a data input terminal coupled to the base electrode of said transistor, said emitter electrode of said transistor coupled to a common ground connection, a first diode with its anode electrode coupled to the positive terminal of the first secondary winding of said first transformer, a first resistor with one end coupled to the cathode electrode of said first diode and the other end to the base electrode of said transistor, a first capacitor with one end coupled to said cathode electrode of said first diode and the other end to the other terminal of said first secondary winding of said transformer and to said common ground connection, whereby a positive-going waveform forward biases said base-emitter junction of said first transistor causing a change in voltage to be developed across said transformer primary winding, said voltage being coupled back to the base electrode of said first transistor through said first diode and first resistor causing regeneration of said biasing action until said first transistor is saturated.

6. The circuit as defined in claim 5 further including a second diode with its cathode electrode coupled to the positive terminal of the second secondary winding of said first transformer and with the anode electrode coupled to said common ground connection, a third diode with its anode electrode coupled to the cathode terminal of said second diode, said cathode terminal of said third diode being the output terminal of said first circuit means, whereby said second diode prevents regeneration of the biasing action when said transistor is back biased, and wherein said third diode prevents signal feedback from said second circuit means.

7. The circuit as defined in claim 6 wherein said second circuit means comprises a second transistor with emitter, base and collector electrodes, said base electrode of said second transistor coupled to said data input terminal, and said emitter electrode of said second transistor coupled to said common ground connection, a second transformer with a primary winding and first and second secondary windings, said primary winding coupled in series between a power supply source and the collector electrode of said second transistor, a fourth diode with its cathode electrode coupled to the positive terminal of the first secondary winding of said second transformer, a second resistor with one end coupled to the anode electrode of said fourth diode and the other end to the base electrode of said second transistor, a second capacitor with one end coupled to said anode electrode of said fourth diode and the other end to the other terminal of said first secondary winding of said second transformer and to said common ground connection, whereby a negative-going waveform reduces the forward bias on said base-emitter junction of said second transistor causing a change in voltage to be dewinding, said voltage being coupled back to the base veloped across said second transformer primary electrode of said second transistor through said fourth diode and second resistor causing regeneration of said biasing action until said second transistor is back biased.

8. The circuit as defined in claim 7 further including a fifth diode with its anode electrode coupled to the positive terminal of said second secondary winding of said second transformer and to said common ground connection and with the cathode electrode coupled to the other end of said second secondary winding of said second transformer, a sixth diode with its anode electrode coupled to the cathode electrode of said fifth diode, said cathode electrode being the output terminal of said second circuit means, whereby said fifth diode prevents regeneration of the biasing action to occur during forward biasing of said second transistor, and wherein said sixth diode prevents signal feedback from said first circuit means.

References Cited

UNITED STATES PATENTS

| | | | |
|---|---|---|---|
| 3,121,197 | 2/1964 | Irland | 325—320 X |
| 3,187,262 | 6/1965 | Crane | 329—126 X |
| 3,244,986 | 4/1966 | Rumble | 328—118 X |
| 3,341,782 | 9/1967 | Aemmes | 329—134 X |
| 3,408,581 | 10/1968 | Wakamoto et al. | 328—118 X |
| 3,307,112 | 2/1967 | Clark | 329—104 |

ALFRED L. BRODY, Primary Examiner

U.S. Cl. X.R.

178—66; 307—233; 325—320; 328—140, 135; 329—103, 204

PO-1050 (5/69)

UNITED STATES PATENT OFFICE

CERTIFICATE OF CORRECTION

Patent No. 3,491,305 Dated January 20, 1970

Inventor(s) Roger B. Stone

It is certified that error appears in the above-identified patent and that said Letters Patent are hereby corrected as shown below:

Column 6, line 72 should be line 73 as printed;

Column 6, line 73 should be line 72 as printed.

SIGNED AND SEALED

JUN 16 1970

(SEAL)
Attest:

Edward M. Fletcher, Jr.
Attesting Officer

WILLIAM E. SCHUYLER, J
Commissioner of Patent